United States Patent
Kroener et al.

(10) Patent No.: US 10,459,689 B2
(45) Date of Patent: Oct. 29, 2019

(54) CALCULATION OF A NUMBER OF ITERATIONS

(71) Applicant: INTERNATIONAL BUSINESS MACHINES CORPORATION, Armonk, NY (US)

(72) Inventors: Klaus M. Kroener, Ehningen (DE); Silvia Melitta Mueller, Altdorf (DE); Manuela Niekisch, Gechingen (DE); Kerstin Schelm, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 14/735,271

(22) Filed: Jun. 10, 2015

(65) Prior Publication Data
US 2015/0363170 A1    Dec. 17, 2015

(30) Foreign Application Priority Data

Jun. 13, 2014   (GB) .................................. 1410591.0

(51) Int. Cl.
*G06F 7/537*   (2006.01)
*G06F 7/48*    (2006.01)
*G06F 7/533*   (2006.01)

(52) U.S. Cl.
CPC .............. *G06F 7/5375* (2013.01); *G06F 7/48* (2013.01); *G06F 7/533* (2013.01)

(58) Field of Classification Search
CPC ................................ G06F 7/5375; G06F 7/533
See application file for complete search history.

(56) References Cited

U.S. PATENT DOCUMENTS

| 4,760,550 A | 7/1988 | Katsman et al. |
| 6,751,645 B1 | 6/2004 | Gorshtein et al. |
| 8,060,551 B2 | 11/2011 | Avss et al. |
| 8,402,078 B2 | 3/2013 | Weinberg et al. |
| 2004/0249877 A1 | 12/2004 | Gerwig et al. |

(Continued)

FOREIGN PATENT DOCUMENTS

| EP | 0361886 A2 | 4/1990 |
| EP | 0809179 A2 | 11/1997 |

(Continued)

OTHER PUBLICATIONS

Smith et al. "The Architecture of Virtual Machines", published in Computer (vol. 38, Issue: 5, May 2005), on May 16, 2005.*

(Continued)

*Primary Examiner* — Andrew Caldwell
*Assistant Examiner* — Emily E Larocque
(74) *Attorney, Agent, or Firm* — Heslin Rothenberg Farley & Mesiti P.C.; Steven Chiu, Esq.

(57) ABSTRACT

Performing an arithmetic operation in a data processing unit, including calculating a number of iterations for performing the arithmetic operation with a given number of bits per iteration. The number of bits per iteration is a positive natural number. A number of consecutive digit positions of a digit in a sequence of bits represented in the data processing unit is counted. The length of the sequence is a multiple of the number of bits per iteration. A quotient of the number of consecutive digit positions divided by the number of bits per iteration is calculated, as well as a remainder of the division.

4 Claims, 7 Drawing Sheets

(56) References Cited

U.S. PATENT DOCUMENTS

2007/0050435 A1* 3/2007 Jacobi ..................... G06F 7/74
                                                        708/200
2008/0275931 A1   11/2008 Schmookler

FOREIGN PATENT DOCUMENTS

| GB | 2421327 A | * | 6/2006 | ............... G06F 7/52 |
| GB | 2421327 A |   | 6/2006 | |
| JP | 5397061 B2 |   | 1/2014 | |

OTHER PUBLICATIONS

IEEE 100 the Authoritative Dictionary of IEEE Standards Terms, seventh edition, K. Breitfelder, et al editors, 2000, p. 207, 208, 272, 684, 872. (Year: 2000).*

Search Report under Section 17(5) for GB1410591.0 dated Jan. 13, 2015, pp. 1-3.

"Divide Algorithm," IP.com Disclosure No. IPCOM000067009D, Jun. 1979, pp. 1-5.

"Iterative Method of Extended Integer Divide," IP.com Disclosure No. IPCOM000170316D, May 2008, pp. 1-6.

Krishnamoorthy, P., et al., "Quotient Prediction for Low Power Division," 2013 IEEE 26$^{th}$ International SOC Conference (SOCC), Sep. 2013, pp. 273-277.

* cited by examiner

CALCULATION OF A NUMBER OF ITERATIONS

PRIOR FOREIGN APPLICATION

This application claims priority from United Kingdom patent application number 1410591.0, filed Jun. 13, 2014, which is hereby incorporated herein by reference in its entirety.

BACKGROUND

One or more aspects relate in general to data processing systems, and in particular, to performing an arithmetic operation, by, for instance, iterative digit accumulations, in a data processing unit.

Fixed point operations, like, for example, integer divide operations, in general require many cycles to achieve the desired output precision, specified by a computing architecture. As such, many different algorithms have emerged to take advantage of different dataflow architectures in order to increase performance and throughput of these "slow" instructions.

Dividers are used in microprocessors and data-processing devices to perform arithmetic division. Because floating-point numbers and integers are represented differently in binary, and because the operations differ as a result, separate floating point and integer dividers are generally provided. Typically, floating point division is considered to be more important for high-demand applications, such as graphics and multimedia applications. Also, integer division is not performed with the same frequency as other mathematical operations. Consequently, many manufacturers save die real estate by providing only the most basic single bit per cycle (radix-2) integer divider, which reduces performance. While combined floating point and integer dividers are known, they generally have not provided significant performance or space-efficiency improvements over separate dividers.

Integer division and floating point division are commonly performed using one of a variety of well-known subtractive algorithms. Subtractive algorithms each include a sequence of shift, subtract, and compare operations. Among subtractive algorithms, restoring, non-restoring and the Sweeney, Robertson, and Tocher (SRT) division algorithms are known.

Subtractive division works similarly to standard long division. Each digit of the dividend, starting with the most significant digit, is compared to the divisor, and a digit of the quotient is computed. In computers, this is accomplished by the typical one bit per cycle (radix-2) integer divider by aligning the most significant bit of the dividend with the least significant bit of the divisor, subtracting the aligned digits, shifting the partial remainder to the left, subtracting, shifting again, and so on. For a 64-bit number, the minimum number of cycles is 64, plus several cycles for setting up the computation. Even in cases where the numbers have significantly fewer digits or the dividend is smaller than the divisor (a case which always results in zero for integer numbers) the entire process is performed. Thus, even radix-4 and radix-8 integer dividers, which process multiple bits per cycle, can be very inefficient.

GB 2 421 327 A, which is hereby incorporated herein by reference in its entirety, discloses a method for dividing integers comprising counting the number of leading sign bits of both the dividend and the divisor (e.g. the number of leading zeroes before the most significant one in a positive number or the number of leading ones before the most significant zero in a two's complement negative number), calculating the number of digits in the quotient by subtracting the number of leading sign bits in the dividend from the number of leading sign bits in the divisor and adding one, normalizing both the dividend and the divisor (e.g. by left shifting), and then calculating the digits in the quotient by using a subtractive divider such as one using a non-restoring SRT algorithm.

SUMMARY

According to one aspect of the invention, a method is provided for performing an arithmetic operation in a data processing unit, including calculating a number of iterations for performing the arithmetic operation with a given number of bits per iteration, in which the number of bits per iteration is a positive natural number. The method includes, for instance, counting a number of consecutive digit positions of a digit in a sequence of bits represented in the data processing unit, wherein the length of the sequence is a multiple of the number of bits per iteration. The method further includes calculating a quotient of the number of consecutive digit positions divided by the number of bits per iteration, as well as calculating a remainder of the division.

BRIEF DESCRIPTION OF THE DRAWINGS

One or more aspects of the present invention together with the objects and advantages may best be understood from the following detailed description of the embodiments, but not restricted to the embodiments, wherein is shown in.

DETAILED DESCRIPTION

Figure 1:
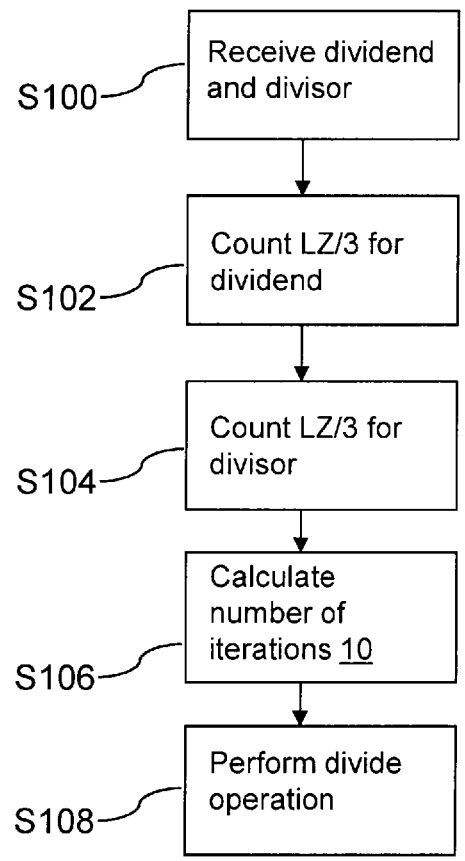
FIG. 1 a flowchart of performing an integer divide operation in a data processing unit according to an embodiment of one or more aspects of the invention with a number of three bits per iteration.

In the drawings, like elements are referred to with equal reference numerals. The drawings are merely schematic representations, not intended to portray specific parameters of aspects of the invention. Moreover, the drawings are intended to depict only typical embodiments of the invention and therefore should not be considered as limiting the scope of the invention. Numerals of the expressions used in the explanation may be looked up in the FIGS. 5 and 7.

FIG. 1 shows a flowchart of one or more aspects for performing an integer divide operation as an example of an arithmetic operation in a data processing unit 216 (FIG. 9), by, for instance, iterative digit accumulations, according to an embodiment of the invention with a number of three bits per iteration 12. One or more aspects include calculating a number of iterations 10 for performing the divide operation with a given number of three bits per iteration 12. The method includes, for instance, (i) counting a number of leading zeroes as consecutive digit positions 32 of the digit zero in a sequence of bits 16 represented in the data processing unit 216, wherein the length of the sequence 16 is a multiple of the number of three bits per iteration 12, as well as (ii) calculating a quotient of the number of leading zeroes as consecutive digit positions 32 divided by the number of three bits per iteration 12, and finally (iii) calculating a remainder of the division.

Thus in step S100 of the flowchart shown dividend and divisor for the divide operation are received. Then in step S102 the number of leading zeroes as consecutive digit positions 32 of the digit zero in a sequence of bits 16 are counted for the dividend, whereas in the next step S104 the number of leading zeroes for the divisor are counted. Next in step S106 a number of iterations 10 for performing the divide operation with a desired precision of the computation result is calculated as the difference in leading zero as consecutive digit positions 32 of both operands divided by the number of bits per iteration, which is three for the embodiment explained in FIG. 1. Finally the divide operation, e.g. an SRT operation, is performed in the final step S108.

Figure 2:
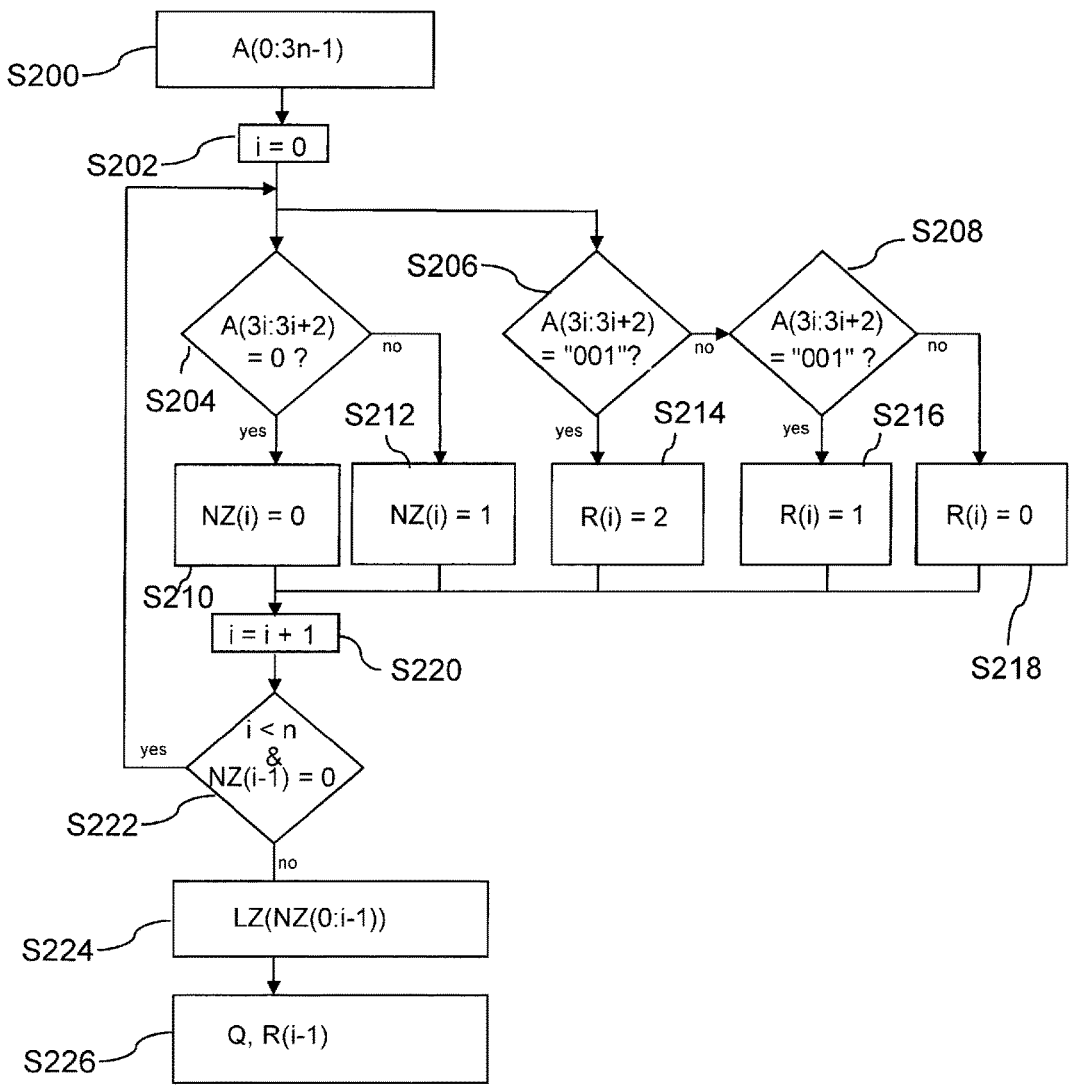
FIG. 2 a detailed flowchart for executing one or more aspects in an integer divide operation implemented with leading zeroes as consecutive digits and a number of three bits per iteration according to one embodiment of the invention.

In FIG. 2 a detailed flowchart is shown for executing one or more aspects of in an integer divide operation implemented with leading zeroes as consecutive digits and a number of three bits per iteration 12 according to an embodiment of the invention.

The digit is equal to zero in the embodiment shown, but could on the other hand according to other embodiments also be a one or an algebraic sign. The algebraic sign can be a minus, a plus, or another symbol used in a data processing system for representation of a specific data format. Also the consecutive digit position 32 is a leading position of the digit zero in the sequence of bits 16, but could alternatively also be a trailing position according to other embodiments.

The arithmetic operation may be implemented as an SRT computation process, which is frequently used for an integer division operation. Nevertheless the arithmetic operation could also be one of integer multiplication or any elementary function that can be implemented based on an iterative algorithm, for example the exponential function or logarithmic function, according to other embodiments.

One or more aspects include dividing the sequence of bits 16 in groups 22, each group 22 having a length of the number of bits per iteration 12. For each group 22 (a) its remainder 24 is calculated by determining a first non-digit position 26, and (b) a non-digit bit 28 is calculated by determining if any of the bits of a group 22 is not equal to the digit zero. Next the non-digit bits 28 are concatenated in the order of the respective groups 22, and then a quotient 30 of the number of leading zeroes as consecutive digit positions 32 in the sequence of bits 16 and the number of three bits per iteration 12 is calculated by counting leading zeroes as consecutive digits 54 for the concatenated non-digit bits 28. Finally a remainder 34 for the quotient 30 is determined by obtaining the remainder 24 of the leading group 22 with a non-digit bit 28.

In step S200 an operand is received, which exhibits a total length of 3n bits, where 3 is the number of bits per iteration 12 in the embodiment shown. This means, that the number of groups 22, into which the sequence of bits 16 is divided, is equal to n. Next a loop over the number of groups 22 is started in step S202 with a group index i of zero. In step S204 it is checked if the group 22 is equal to zero. If so, then in step S210 a group non-digit bit (NZ) 28 is set to zero, otherwise in step S212 it is set to one. In step S206 it is checked if the group 22 has two leading zeroes as consecutive digits, thus using a consecutive digit count operation for calculating the remainder 24 of a group 22. If so, then in step S214 a group remainder 24 is set to two, otherwise it is checked in step S208 if the group 22 has one leading zero. If so, then in step S216 the group remainder 24 is set to 1, otherwise in step S218 it is set to zero. Next, in step S220, the group index i is incremented by one. The whole loop is run again with the steps S204 and S206, until the group index i is equal to n or the group non-digit bit 28 is equal to one S222. Then in step S224 the leading zeroes of NZ are counted and in step S226 the quotient (Q) 30 as leading zero count divided by three as well as the remainder 34 are obtained as a result of the procedure.

Figure 3:
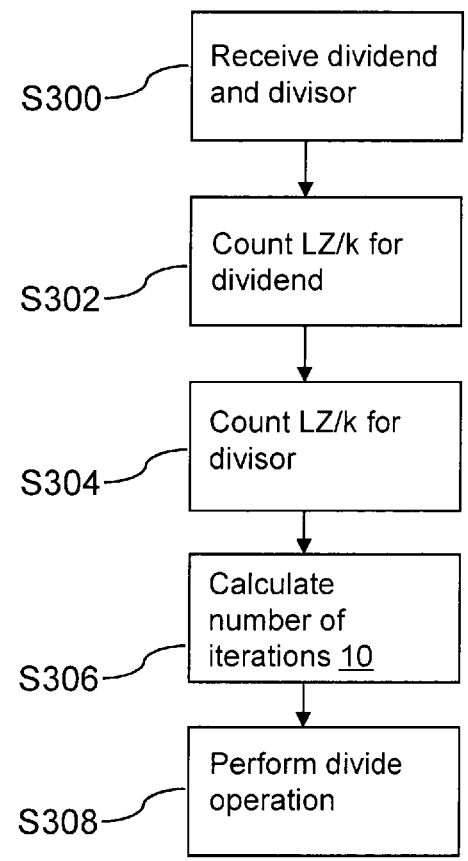
FIG. 3 a flowchart of one or more aspects for performing an integer divide operation in a data processing unit according to an embodiment of the invention with a number of k bits per iteration.

FIG. 3 shows a flowchart of one or more aspects for performing an integer divide operation in a data processing unit 216, by, for instance, iterative digit accumulations, according to an embodiment of the invention with a number of k bits per iteration 12, where k is a natural number. The flowchart is similar to the flowchart shown in FIG. 1, except that in FIG. 3 a general embodiment with k bits per iteration is foreseen. Thus in step S300 of the flowchart shown a dividend and divisor for the divide operation are received. Then in step S302 the number of leading zeroes as consecutive digit positions 32 of the digit zero in a sequence of bits 16 are counted for the dividend, whereas in the next step S304 the number of leading zeroes for the divisor are counted. Next in step S306 a number of iterations 10 for performing the divide operation with a desired precision of the computation result is calculated as the difference in leading zero as consecutive digit positions 32 of both operands divided by the number of bits per iteration, which is k for a general embodiment. Finally the divide operation is performed in the final step S308.

Figure 4:
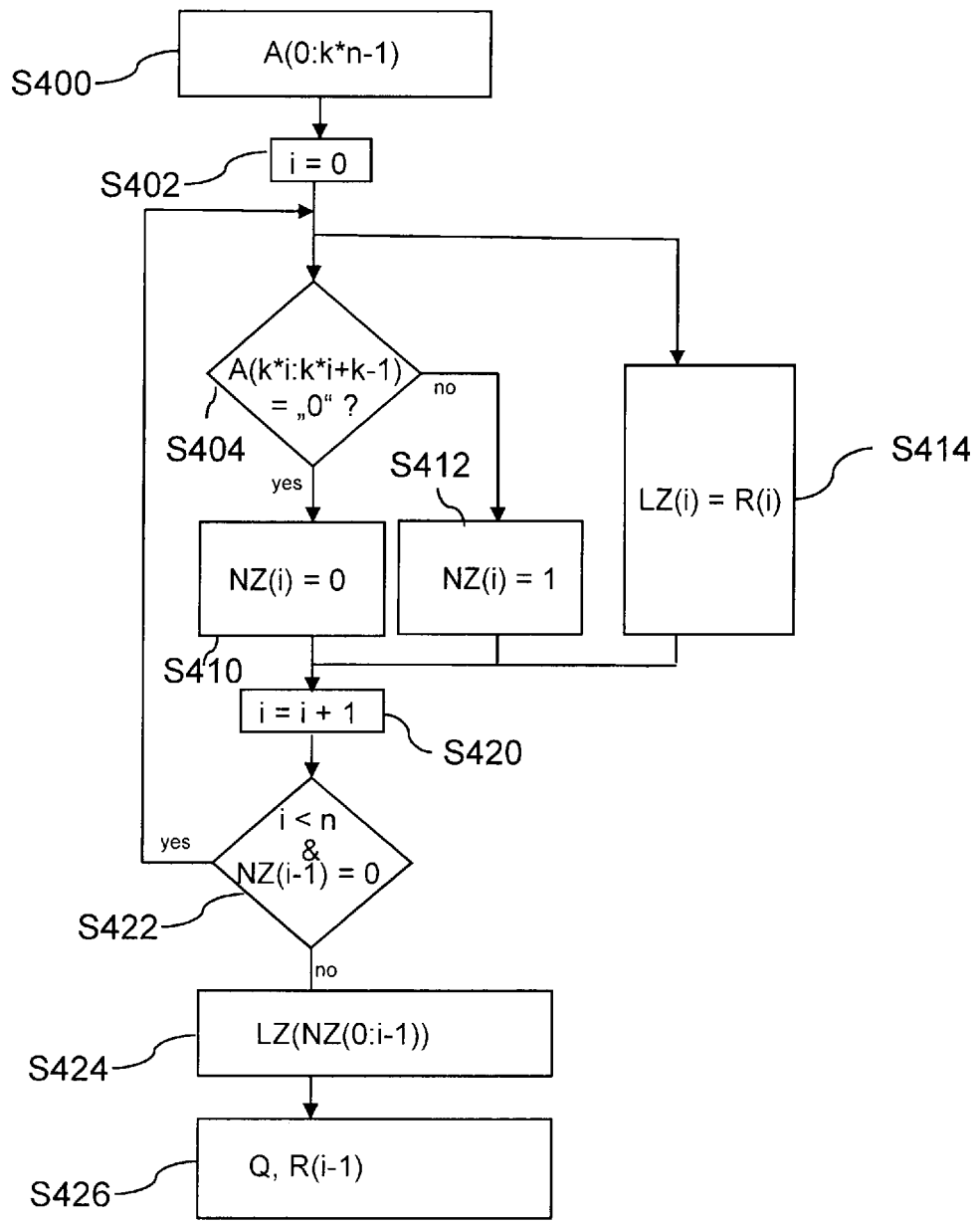
FIG. 4 a detailed flowchart for executing one or more aspects in an integer divide operation implemented with leading zeroes as consecutive digits and a number of k bits per iteration according to an embodiment of the invention.

In FIG. 4 a detailed flowchart is shown for executing one or more aspects in an integer divide operation implemented with leading zeroes as consecutive digits and a number of k bits per iteration 12 according to an embodiment of the invention, where k is a natural number. The flowchart is similar to the flowchart shown in FIG. 2, except that in FIG. 4 a general embodiment with k bits per iteration is foreseen. Thus in step S400 an operand is received, which exhibits a total length of k*n bits, where k is the number of bits per iteration 12 in the embodiment shown. This means, that the number of groups 22, into which the sequence of bits 16 is divided, is equal to n. Next a loop over the number of groups 22 is started in step S402 with a group index i of zero. In step S404 it is checked if the group 22 is equal to zero or to another digit used according to one or more aspects. If so, then in step S410 a group non-digit bit (NZ) 28 is set to zero, otherwise in step S412 it is set to one. In step S414 the leading zeroes as consecutive digits of the group 22 are counted, thus using a consecutive digit count operation for calculating the group remainder 24 of a group 22. Next, in step S420, the group index i is incremented by one. The whole loop is run again with the steps S404 and S414, until the group index i is equal to n or the group non-digit bit 28 is equal to one, S422. Then in step S424 the leading zeroes of NZ are counted and in step S426 the quotient (Q) 30 as leading zero count divided by k as well as the remainder 34 are obtained as a result of the procedure.

Figure 5:
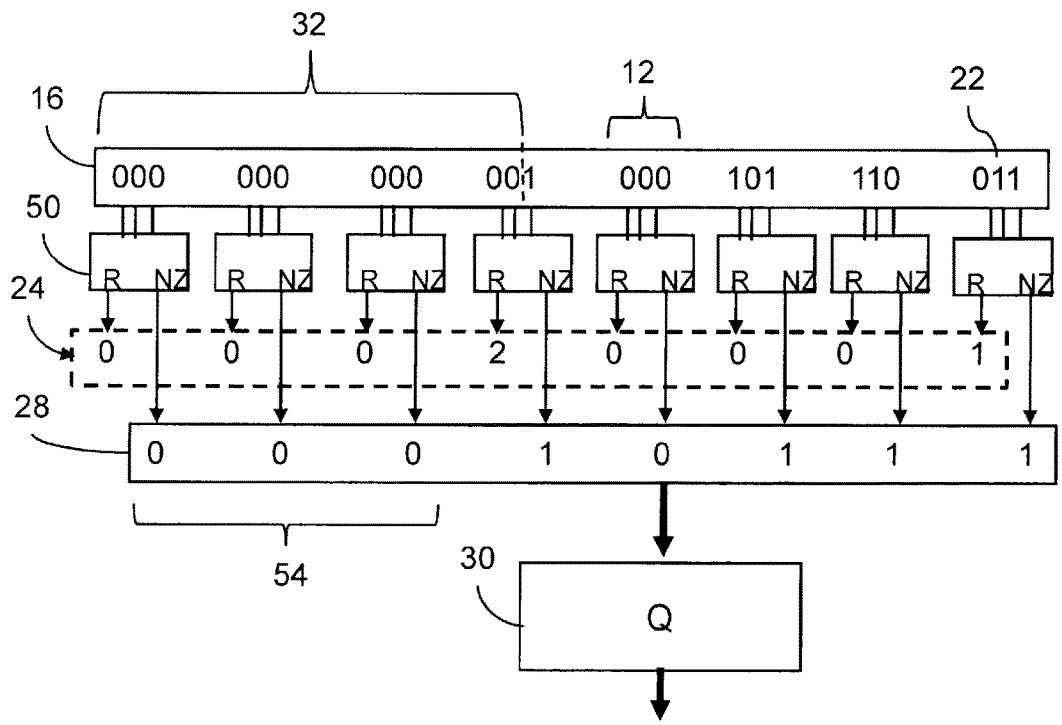
FIG. 5 an implementation of one or more aspects in an integer divide operation with counting the number of leading zeroes in a sequence of bits with integrated division by the number of three bits per iteration according to an embodiment of the invention.

FIG. 5 demonstrates an implementation of one or more aspects in an integer divide operation with counting a number of leading zeroes as consecutive digit positions 32 of the digit zero in a sequence of twenty-four bits 16 with integrated division by three bits per iteration 12 according to an embodiment of the invention. FIG. 5 shows in the upper part the dividing of the sequence of bits 16 into the different groups 22 with a length of the number of bits per iteration 12, in the embodiment shown a number of three as well as the determination of the group remainders 24 and the group non-digit bits 28 by a module 50. The group non-digit bits 28 are concatenated in the order of the groups 22. The sequence of bits 16 exhibits a number of consecutive digits 32, namely leading zeroes, whereas the quotient 30 resulting at the end of the process is equal to three according to the number of consecutive digits 54 of three in the sequence of group non-digit bits 28.

Figure 6:
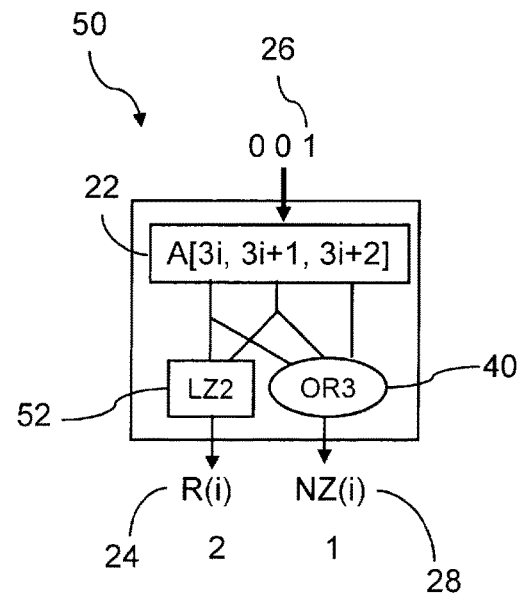
FIG. 6 a module for the determination of the group remainders and the group leading zeroes according to the implementation of FIG. 5.

In FIG. 6, the module 50 for the determination of the group remainders 24 and the group non-digit bits 28 according to the implementation of FIG. 5 is explained in more detail. It includes an input of three bits, in the case shown a group of "001" with a non-digit position 26 as a "1" at the last position. The group 22 of the three bits is searched for consecutive non-digits in the sub module 52 which implements in the embodiment shown a two bit zero count, for determining the group remainder 24 as explained in the flowchart in FIG. 2. A three bit OR gate 40 determines the group non-digit bit 28, as is foreseen as part of a data processing unit 216 for performing a method according to one or more aspects of the invention.

Figure 7:
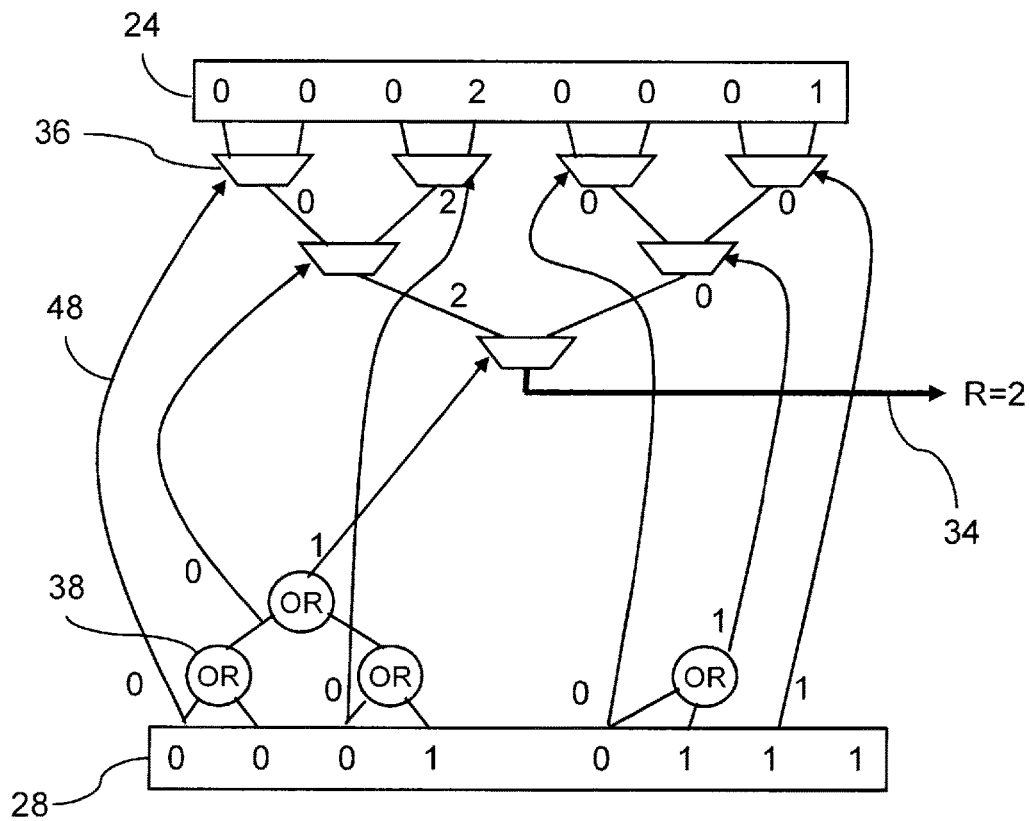
FIG. 7 an implementation of one or more aspects in an integer divide operation with calculating a remainder for the quotient determined in FIG. 5.

FIG. 7 exhibits an implementation of one or more aspects in an integer divide operation with calculating a remainder 34 for the quotient 30 determined in FIG. 5. The remainder 34 for the quotient 30 is calculated by using the remainders 24 of the groups 22 as input for a tree of multiplexers 36 controlled by OR gates 38 fed by the concatenated non-digit bits 28, as will be foreseen in a data processing unit 216 according to one or more aspects of the invention. As the sequence of bits 16 contains twenty-four bits in 8 groups 22 of three bits, a tree of 7 multiplexers 36 is used. The function of the multiplexers 36 is explained in FIG. 8. The group remainders 24, concatenated according to the sequence of the groups 22, are fed to the four multiplexers 36 in a first level. The group non-digit bits 28, also concatenated in the order of the groups 22 are used as control input via a network of OR gates 38 for the multiplexers 36. The output of the four multiplexers 36 of the first level are then fed to two multiplexers 36 at the second level, where the output is fed to a single multiplexer 36 at the third level, thus delivering a remainder 34 for the quotient 30, in the embodiment shown a number of 2.

Figure 8:
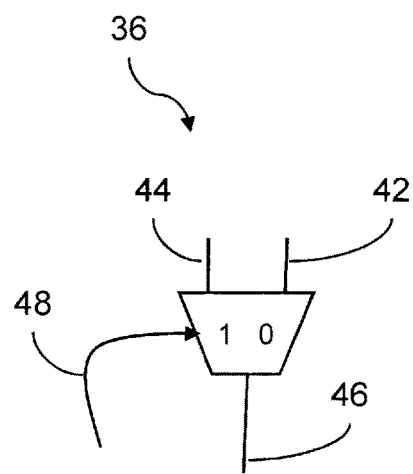
FIG. 8 a multiplexer as used in the implementation in FIG. 7.

In FIG. 8 the functioning of a multiplexer 36 as used in the implementation in FIG. 7 is explained. The multiplexer 36 exhibits two data inputs 42 and 44 as well as a control input 48. If the control input 48 is zero it will feed the data input 42 to the output 46, if the control input 48 is one it will feed the data input 44 to the output 46.

Figure 9:
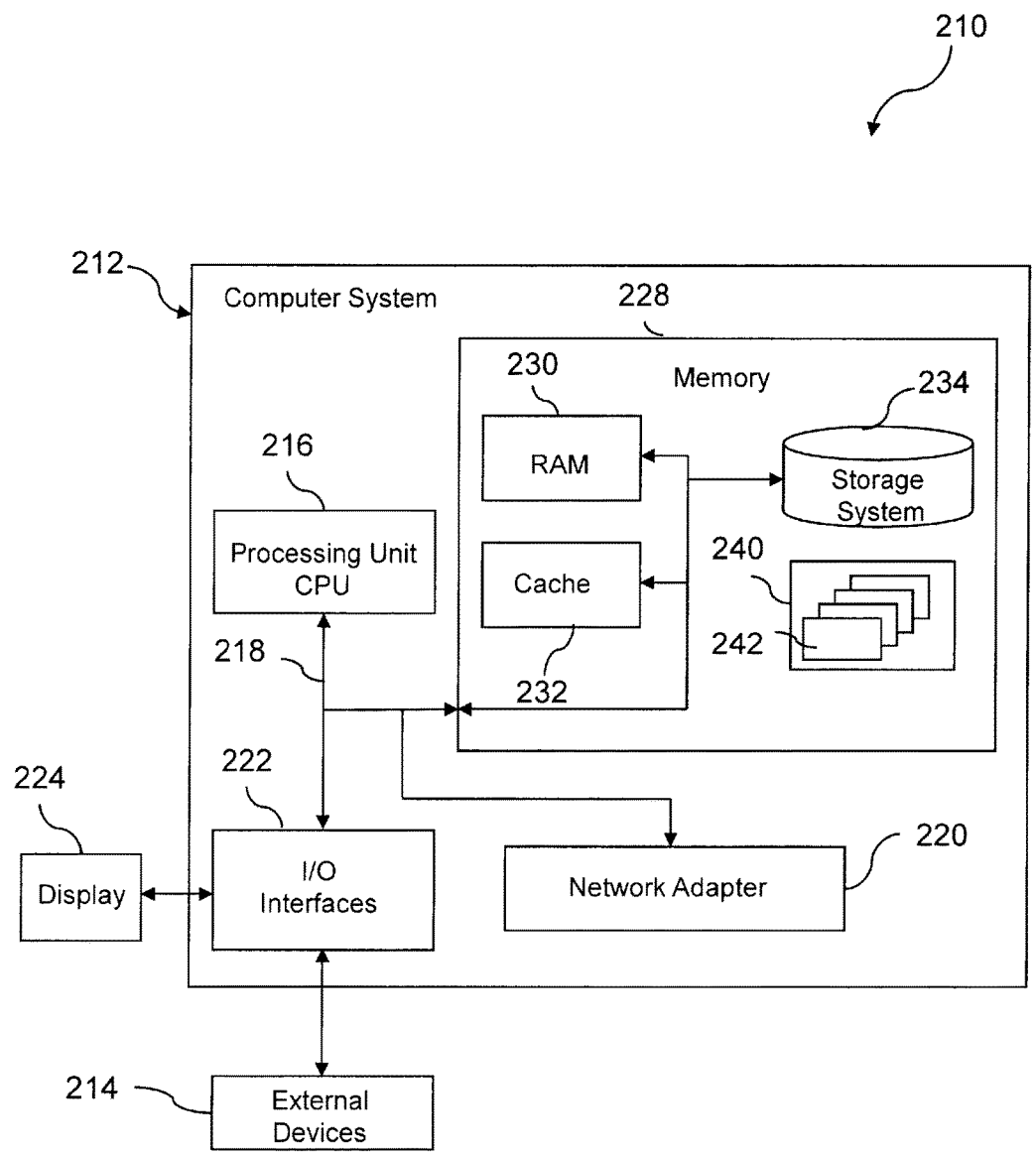
FIG. 9 an example embodiment of a data processing system for executing a method according to one or more aspects of the invention.

Referring now to FIG. 9, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

The data processing system 210 is capable of running a computer program product comprising a computer usable medium including a computer readable program, wherein the computer readable program when executed on a computer system 212 causes the computer system 212 to perform a method for performing an arithmetic operation in a data processing unit 216, by, e.g., iterative digit accumulations, including calculating a number of iterations 10 for performing the arithmetic operation with a given number of bits per iteration 12, wherein the number of bits per iteration 12 is a positive natural number, including (i) counting a number of consecutive digit positions 32 of a digit in a sequence of bits 16 represented in the data processing unit 216, wherein the length of the sequence 16 is a multiple of the number of bits per iteration 12, (ii) calculating a quotient of the number of consecutive digit positions 32 divided by the number of bits per iteration 12, (iii) calculating a remainder of the division.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data.

Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

One or more aspects provide a method and a data processing unit for performing an arithmetic operation in the data processing unit, the arithmetic operation being optimized concerning execution performance and hardware resource consumption.

In a further aspect, a data processing system is provided for executing the method for performing an arithmetic operation in the data processing unit, the arithmetic operation being optimized concerning execution performance and hardware resource consumption, comprising such a data processing unit.

Arithmetic operations, such as those by iterative digit accumulations, like integer divide instructions are frequently used in modern data processing systems for critical functions like hashing, compression, etc. Slow implementations impact the performance of critical applications. As todays data processing systems are running at clock cycles of up to 6 GHz, performance of such operations might be very important.

State of the art implementations of integer division are mostly SRT based, where the number of iterations, used to get a desired precision of the computation result, is a function of the difference of leading zeroes as one embodiment of counting consecutive digits in the sequence of bits, which may also be named as a vector of bits, of two input operands of the division and the number of bits calculated in each iteration. The number of iterations may then be estimated by dividing the difference of the number of leading zeroes by the number of bits per iteration and rounding up the quotient. The number of bits per iteration k is typically selected as a power of two (k=2, 4, . . . ) to facilitate the calculation of the number of iterations.

Depending on the design of a data processing system, a k=4 implementation may not fit into a computation cycle of the data processing system, and a k=2 implementation may be lacking performance.

Choosing k=3 may exploit a given cycle time but makes a divide by 3 calculation necessary to compute the number of iterations needed. A leading zero counter for counting consecutive digits represented as zeroes in a leading position, together with an integrated divide function may allow to perform the number of iterations calculation without any additional cycles needed whereas several cycles would be needed without it. Alternatively also other numbers k, which are not a power of two, such as e.g. k=5, may be used as a number of bits per iteration, depending on the architecture of a data processing system used.

One or more aspects of the invention include the calculation of a number of iterations for a desired precision of a computation result by a combination of a consecutive digit counter, like a leading zero counter, and a divide function which delivers the number of consecutive digits, like leading zeroes, divided by a fixed number of bits per iteration k together with the remainder of this division. This combined divide/leading zero counter allows a calculation of the number of iterations to be used without adding extra computation cycles to the implementation. Calculating a quotient of the difference of the leading zeroes of the input operands divided by the number of bits per iteration without one or more aspects of the invention would need an iterative algorithm which is expensive concerning performance and circuit area of a data processing system.

In different embodiments, the digit may be one of a zero, a one or an algebraic sign, depending on the representation of numbers in a data processing system and depending on the kind of arithmetic operation the data processing unit is executing. The algebraic sign can be a minus, a plus, or another symbol used in a data processing system for representation of a specific data format.

In one embodiment, the arithmetic operation using an SRT computation process is addressed. However, one or more aspects are not restricted to a SRT divide algorithm. Also, square-root operations may be realized with the SRT algorithm. Other arithmetic or elementary functions being realized using iteration based algorithms are suited to be used too.

The arithmetic operation may be an integer division operation. This represents a frequently used arithmetic operation used in quite a number of arithmetic algorithms. Besides, an integer division operation may be implemented in an SRT algorithm suited for one or more aspects of the invention.

In other embodiments, the arithmetic operation may be one of an integer multiplication or any elementary function that can be implemented based on an iterative algorithm, for example the exponential function or logarithmic function. These arithmetic functions may be implemented in an SRT like algorithm too, such that one or more aspects may be applied to these functions as well.

Further the consecutive digit position may be a leading position of the digit in the sequence of bits, also depending on the representation of numbers in a data processing system and depending on the kind of arithmetic operation the data processing unit is executing. Alternatively also trailing positions may be used for applying one or more aspects in iterative algorithms.

In one embodiment, the method may include the following sequence. The method first starts by dividing the sequence of bits in groups, each group having a length of the number of bits per iteration. Then for each group the method continues by calculating its remainder by determining a first non-digit position, and calculating a non-digit bit by determining if any of the bits of a group is not equal to the digit. Further, having finished the loop over the groups, the method includes concatenating the non-digit bits in the order of the respective groups, calculating a quotient of the number of consecutive digit positions in the sequence of bits and the number of bits per iteration by counting consecutive digits for the concatenated non-digit bits, and finally determining a remainder for the quotient by obtaining the remainder of a leading group with a non-digit bit if a leading position of the digit is used or of a trailing group with a non-digit bit if a trailing position of the digit in the sequence of bits is used.

A consecutive digit count operation may be used for calculating the remainder of a group. Thus, a remainder may be calculated in one embodiment by counting the leading zeroes in a group and then setting the remainder according to the number of leading zeroes determined in the group. For example, the remainder may be one for one leading zero and two for two leading zeroes determined in the group.

An OR gate or an AND gate or another evaluating function, depending on the specific digit representation used, may be used for calculating a non-digit bit of a group. Such a device is suited, for instance, for determining a non-digit position of a bit in a group, like a first non-zero position, for example, in order to determine a number of consecutive digit positions, like leading zero positions.

Generally, in examples, OR gates are for counting leading zeroes (0), whereas AND gates are for counting leading ones (1).

In one embodiment, the remainder for the quotient may be calculated by using the remainders of the groups as input for multiplexers controlled by OR gates or AND gates or another evaluating function depending on the specific digit representation used, fed by the concatenated non-digit bits. Thus, the calculation of the remainder may be realized in a hardware implementation in a very time saving and cost efficient way. The implementation may be realized in a very limited basis of logic levels and circuits needed. Also the electronic circuits used for determining the remainders for the quotient are relatively simple circuits, such that the one or more aspects exhibit a very cost, as well as chip area, efficient technique.

According to a further aspect of the invention, a data processing unit is provided for performing a method for performing an arithmetic operation in a data processing unit, by iterative digit accumulations, including calculating a number of iterations for performing the arithmetic operation with a given number of bits per iteration, including OR gates or AND gates or another evaluating function depending on the specific digit representation used for calculating a non-digit bit of a group. Such a device is suited for determining a non-digit position of a bit in a group, like a first non-zero position, for example, in order to determine a number of consecutive digit positions, like leading zero positions.

In one embodiment, the data processing unit may include multiplexers fed by the remainders of the groups as input and controlled by the concatenated non-digit bits for calculating the remainder for the quotient. Thus, the calculation of the remainder may be realized in a hardware implementation in a very time saving and cost efficient way. The implementation may be realized in a very limited basis of logic levels and circuits needed. Also the electronic circuits used for determining the remainders for the quotient are relatively simple circuits, such that the one or more aspects exhibit a very cost, as well as chip area, efficient technique.

According to a further aspect of the invention, a data processing program for execution in a data processing system is an implementation of an instruction set for performing a method as described above when the data processing program is run on a computer.

Further a computer program product is provided including a computer usable medium including a computer readable program, wherein the computer readable program when executed on a computer causes the computer to perform a method for performing an arithmetic operation in a data processing unit, by iterative digit accumulations, including calculating a number of iterations for performing the arithmetic operation with a given number of bits per iteration, wherein the number of bits per iteration is a positive natural number, including counting a number of consecutive digit positions of a digit in a sequence of bits represented in the data processing unit, wherein the length of the sequence is a multiple of the number of bits per iteration, calculating a quotient of the number of consecutive digit positions divided by the number of bits per iteration, and calculating a remainder of the division.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire connection, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is provided, including software code portions for performing a method described above.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A computer system comprising:
a memory; and
a data processing unit in communications with the memory, the data processing unit comprising:
　a first set of multiplexers;
　a second set of multiplexers;
　a third set of multiplexers; and
　OR gates controlling the first set of multiplexers, wherein the computer system is configured to perform an arithmetic operation in the data processing unit, wherein the arithmetic operation is optimized concerning execution performance and hardware resource consumption in the computer system, the arithmetic operation comprising:
　calculating, by the data processing unit, a number of iterations for performing the arithmetic operation with a given number of bits per iteration, wherein the given number of bits per iteration is a positive natural number, comprising:
　　counting a number of consecutive digit positions of a digit in a sequence of bits represented in the data processing unit, wherein the length of the sequence is a multiple of a number of bits per iteration; and
　　dividing, by the data processing unit, the sequence of bits into groups, each group comprising bits and having a length of the number of the bits per iteration;
　for each group,
　　calculating a group remainder as input for a tree of the first set of multiplexers controlled by the OR gates, comprising a remainder of a group by determining a first non-digit position; and
　　calculating a non-digit bit by determining if any of the bits of a group is not equal to the digit;

concatenating, by the data processing unit, the non-digit bit from each group, in the order of the respective groups, to generate concatenated non-digit bits to feed the tree of the first set of multiplexers controlled by the OR gates, wherein the concatenated non-digit bits are utilized as control input via a network of the OR gates for the first set of multiplexers;

calculating, by the tree of the first set of multiplexers, a quotient of the number of consecutive digit positions in the sequence of bits and the number of bits per iteration by counting consecutive digits for the concatenated non-digit bits, wherein the calculating comprises inputting the quotient and the number into the second set of multiplexers;

identifying, by the second set of multiplexers, from the groups, a trailing group with a trailing non-digit bit, wherein the non-digit bit of the trailing group comprises the trailing non-digit bit, the identifying the trailing group based on a trailing position of the digit in the sequence of bits being used;

determining, by the second set of multiplexers, the group remainder of the trailing group; and based on determining the group remainder of the trailing group, determining, by the third set of multiplexers, a remainder for the quotient.

2. The computer system according to claim 1 wherein, for each group, calculating the group remainder comprises using a consecutive digit count operation.

3. A computer-implemented method of performing an arithmetic operation in a data processing unit, the data processing unit comprising a first set of multiplexers, a second set of multiplexers, a third set of multiplexers, and OR gates controlling the first set of multiplexers, the arithmetic operation being optimized concerning execution performance and hardware resource consumption, the computer-implemented method comprising:

calculating, by the data processing unit, a number of iterations for performing the arithmetic operation with a given number of bits per iteration, wherein the given number of bits per iteration is a positive natural number, comprising:

counting a number of consecutive digit positions of a digit in a sequence of bits represented in the data processing unit, wherein the length of the sequence is a multiple of a number of bits per iteration; and dividing, by the data processing unit, the sequence of bits into groups, each group comprising bits and having a length of the number of the bits per iteration;

for each group,
calculating a group remainder as input for a tree of the first set of multiplexers controlled by the OR gates, comprising a remainder of a group by determining a first non-digit position; and
calculating a non-digit bit by determining if any of the bits of a group is not equal to the digit;

concatenating, by the data processing unit, the non-digit bit from each group, in the order of the respective groups, to generate concatenated non-digit bits to feed the tree of the first set of multiplexers controlled by the OR gates, wherein the concatenated non-digit bits are utilized as control input via a network of the OR gates for the first set of multiplexers;

calculating, by the tree of the first set of multiplexers, a quotient of the number of consecutive digit positions in the sequence of bits and the number of bits per iteration by counting consecutive digits for the concatenated non-digit bits, wherein the calculating comprises inputting the quotient and the number into the second set of multiplexers;

identifying, by the second set of multiplexers, from the groups, a trailing group with a trailing non-digit bit, wherein the non-digit bit of the trailing group comprises the trailing non-digit bit, the identifying the trailing group based on a trailing position of the digit in the sequence of bits being used;

determining, by the second set of multiplexers, the group remainder of the trailing group, wherein the determining comprises inputting the group remainder and the trailing group into the third set of multiplexers; and based on determining by the third set of multiplexers, the group remainder of the trailing group, determining a remainder for the quotient.

4. The computer-implemented method according to claim 3 wherein, for each group, calculating the group remainder comprises using a consecutive digit count operation.

* * * * *